United States Patent
Harada et al.

(10) Patent No.: US 11,870,792 B2
(45) Date of Patent: Jan. 9, 2024

(54) ABNORMAL TRAFFIC ANALYSIS APPARATUS, ABNORMAL TRAFFIC ANALYSIS METHOD, AND ABNORMAL TRAFFIC ANALYSIS PROGRAM

(71) Applicant: NIPPON TELEGRAPH AND TELEPHONE CORPORATION, Tokyo (JP)

(72) Inventors: Takafumi Harada, Musashino (JP); Gembu Morohashi, Musashino (JP); Hiroki Ito, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 629 days.

(21) Appl. No.: 16/982,223

(22) PCT Filed: Mar. 8, 2019

(86) PCT No.: PCT/JP2019/009248
§ 371 (c)(1),
(2) Date: Sep. 18, 2020

(87) PCT Pub. No.: WO2019/181550
PCT Pub. Date: Sep. 26, 2019

(65) Prior Publication Data
US 2021/0029149 A1    Jan. 28, 2021

(30) Foreign Application Priority Data
Mar. 23, 2018 (JP) .............................. 2018-057081

(51) Int. Cl.
*H04L 29/06* (2006.01)
*H04L 9/40* (2022.01)
(Continued)

(52) U.S. Cl.
CPC ....... *H04L 63/1425* (2013.01); *H04W 12/121* (2021.01); *H04W 24/08* (2013.01)

(58) Field of Classification Search
CPC ..... H04L 63/1425; H04L 69/14; H04L 69/40; H04W 12/121; H04W 24/08; H04W 4/70;
(Continued)

(56) References Cited

U.S. PATENT DOCUMENTS 7,937,761 B1* 5/2011 Bennett ............... H04L 63/1416
713/153
2014/0165207 A1* 6/2014 Engel .................. H04L 63/1425
726/25
(Continued)

FOREIGN PATENT DOCUMENTS

JP  2011259014 A  12/2011
JP  5844938 B2    1/2016
(Continued)

*Primary Examiner* — Joseph P Hirl
*Assistant Examiner* — Ka Shan Choy
(74) *Attorney, Agent, or Firm* — Harness, Dickey & Pierce, P.L.C.

(57) ABSTRACT

An abnormal traffic analysis apparatus includes receiving means for receiving traffic from a device via any of a plurality of communication paths in which different communication methods are used, multiple communication management means for identifying a communication path through which the traffic is transmitted, analysis method determination means for determining an analysis algorithm for detecting abnormality of the traffic according to the communication path identified by the multiple communication management means, analysis means for analyzing whether or not the traffic is abnormal traffic by using the analysis algorithm determined by the analysis method deter- (Continued)

mination means, and analysis result recording means for recording a result of analysis performed by the analysis means.

9 Claims, 7 Drawing Sheets

(51) Int. Cl.
*H04W 12/121* (2021.01)
*H04W 24/08* (2009.01)

(58) Field of Classification Search
CPC ....... H04W 4/40; H04W 12/72; H04W 84/12; H04W 24/04; H04W 88/18
See application file for complete search history.

(56) References Cited

U.S. PATENT DOCUMENTS

| | | |
|---|---|---|
| 2016/0014146 A1 | 1/2016 | Nakata |
| 2017/0093910 A1* | 3/2017 | Gukal ................. H04L 63/1491 |
| 2017/0163522 A1* | 6/2017 | Sreeramoju ............. H04L 45/24 |
| 2017/0223046 A1* | 8/2017 | Singh ................. H04L 63/1491 |

FOREIGN PATENT DOCUMENTS

| | | |
|---|---|---|
| JP | 2018121262 A | 8/2018 |
| WO | WO-2016031384 A1 | 3/2016 |

\* cited by examiner

Fig. 6

| IoT IDENTIFIER | IMSI | LTE IP ADDRESS | CONNECTION STATE | Wi-Fi IDENTIFIER | Wi-Fi IP ADDRESS | ... |
|---|---|---|---|---|---|---|
|  |  |  |  |  |  |  |

ABNORMAL TRAFFIC ANALYSIS APPARATUS, ABNORMAL TRAFFIC ANALYSIS METHOD, AND ABNORMAL TRAFFIC ANALYSIS PROGRAM

CROSS-REFERENCE TO RELATED APPLICATIONS

This application is a 371 U.S. National Phase of International Application No. PCT/JP2019/009248, filed on Mar. 8, 2019, which claims priority to Japanese Application No. 2018-057081 filed on Mar. 23, 2018. The entire disclosures of the above applications are incorporated herein by reference.

TECHNICAL FIELD

The present invention relates to an abnormal traffic analysis apparatus, an abnormal traffic analysis method, and an abnormal traffic analysis program that can be applied to SIEM (Security Information and Event Management), security engines, heterogeneous network, etc.

BACKGROUND ART

In recent years, due to the spread of IoT (Internet of things) devices, a large number of IoT devices access a network and cause a large volume of traffic. Furthermore, for the use of IoT devices to control etc., in some cases, low delay is more required for IoT devices when compared to IT devices. Under these trends, architecture regarding networks and information processing needs to be changed, and properly using a plurality of communication methods (communication paths) to more efficiently handle network traffic is proposed as an option.

On the other hand, unauthorized communications (cyber-attacks) that attack infrastructure or various services provided via networks have changed to attacks performed using various methods, and threats are increasing. Conventionally, as a countermeasure for such unauthorized communications, an apparatus that detects unauthorized communications (abnormal traffic) is provided in a network.

CITATION LIST

Patent Literature

[PTL 1] Japanese Patent No. 5844938
[PTL 2] Japanese Patent Application Publication No. 2018-121262

SUMMARY OF THE INVENTION

Technical Problem

Conventionally, it is assumed that traffic is transmitted from a single target IoT device by using a single specific communication method such as LTE (Long Term Evolution). Therefore, an apparatus that detects unauthorized communications (abnormal traffic) analyzes traffic by using an analysis algorithm that is optimized for the specific communication method used to transmit traffic.

Accordingly, under the circumstances in which a large volume of traffic occurs in a network, when traffic is transmitted from an IoT device, if a communication method is selected on an application side and the content of traffic to occur is changed, there may arise a situation in which the traffic cannot be appropriately analyzed.

The present invention was made to solve the above-described problem, and it is an object of the present invention to provide an abnormal traffic analysis apparatus, an abnormal traffic analysis method, and an abnormal traffic analysis program that can appropriately perform analysis regardless of a communication path through which traffic is transmitted from a device.

Means for Solving the Problem

To solve the problem, the present invention takes the following measures.

In a first aspect of the present invention, an abnormal traffic analysis apparatus includes receiving means for receiving traffic from a device via any of a plurality of communication paths in which different communication methods are used, multiple communication management means for identifying a communication path through which the traffic is transmitted, analysis method determination means for determining an analysis algorithm for detecting abnormality of the traffic according to the communication path identified by the multiple communication management means, analysis means for analyzing whether or not the traffic is abnormal traffic by using the analysis algorithm determined by the analysis method determination means, and analysis result recording means for recording a result of analysis performed by the analysis means.

Effects of the Invention

According to the present invention, traffic is analyzed using an appropriate analysis algorithm according to an identified communication path, and therefore the rate of detection of abnormal traffic can be improved.

BRIEF DESCRIPTION OF DRAWINGS

FIG. 6 is a diagram showing one example of a management table that is managed by the monitoring target information management server.

DESCRIPTION OF EMBODIMENTS

Figure 1:
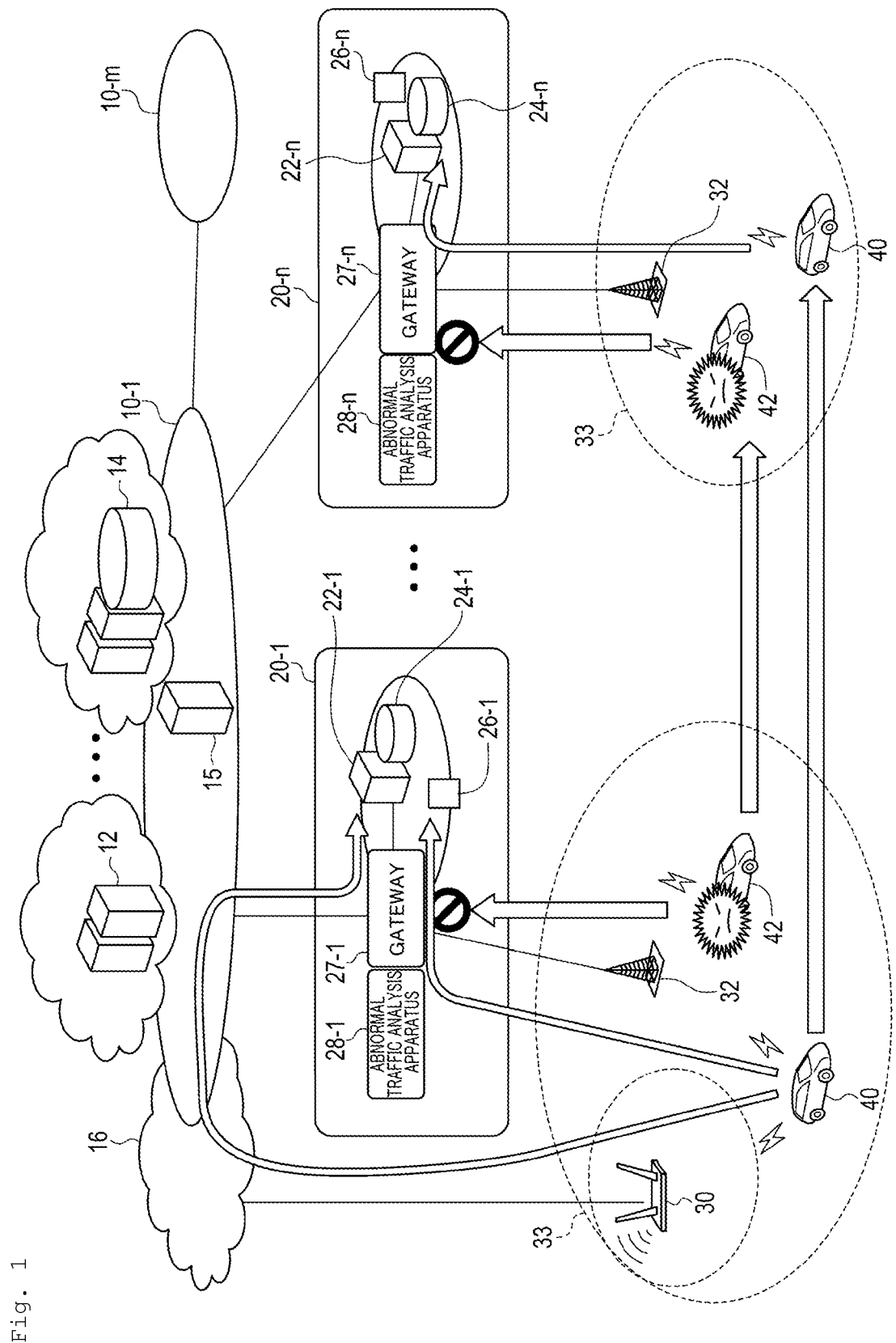
FIG. 1 is a diagram showing one example of a communication system according to the present embodiment.
Figure 2:
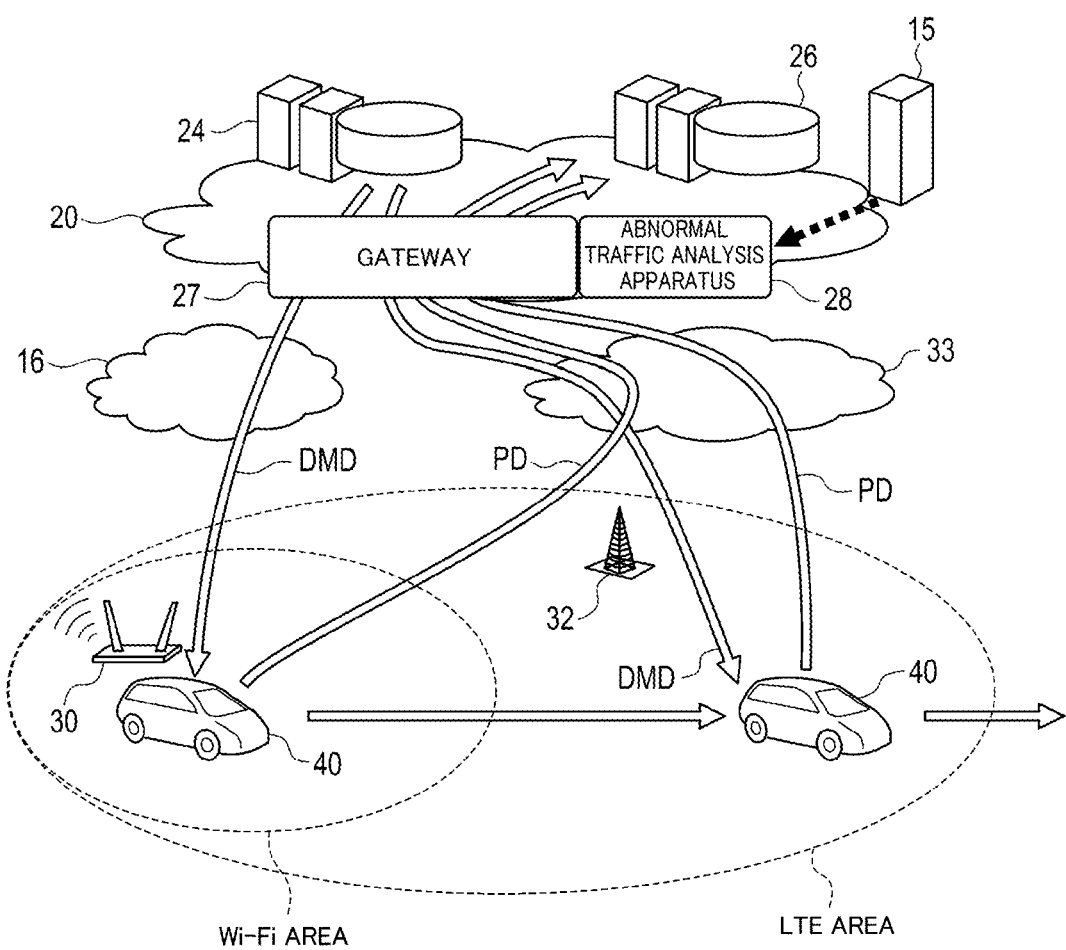
FIG. 2 is a diagram showing one example of a communication system according to the present embodiment.

The following describes the present embodiment with reference to the accompanying drawings. FIG. 1 and FIG. 2 are diagrams each showing one example of a communication system according to the present embodiment. The communication systems shown in FIG. 1 and FIG. 2 each realize an autonomous mobility system for causing automobiles, etc., to autonomously travel, for example. In the autonomous mobility system, various kinds of data (probe data) detected using various sensors, devices, etc., provided in an automobile etc., are transmitted from an IoT device 40 installed in the automobile to a server, for example. The autonomous mobility system reflects probe data received from IoT devices of a large number of automobiles etc., to a dynamic map in real time, and transmits data of the dynamic map to IoT devices of automobiles. The automobiles execute control for self-driving based on the data of the dynamic map.

In the communication system according to the present embodiment, transmission and reception of data (traffic) between an IoT device installed in an automobile etc., and a server are performed using any of a plurality of communication paths in which different communication methods are used, to efficiently transmit and receive a large volume of traffic that occurs in a network. In the present embodiment, LTE (Long Term Evolution) communication that uses a mobile network (mobile network 33) and Wi-Fi communication that uses the Internet 16 can be used as the plurality of communication methods, any of which can be selected, for example.

Note that the plurality of communication methods are not limited to LTE communication and Wi-Fi communication, and another communication method can also be used. Furthermore, the number of communication methods is not limited to two, and a communication method to be used may also be selected from three or more communication methods.

In the communication system shown in FIG. 1, core networks 10 (10-1, . . . , 10-*m*) are provided on the Internet 16. A cloud server 12, a dynamic map server 14, and a monitoring target information management server 15 are provided in each core network 10, for example. The cloud server 12 is a server that supports various services. The cloud server 12 includes an authentication server that identifies an IoT device that is connected to the Internet 16 via a communication path in which a Wi-Fi communication method is used.

The monitoring target information management server 15 manages information regarding IoT devices 40, such as terminals (UE: User Equipment) installed in automobiles etc., to be monitored. The monitoring target information management server 15 manages a correspondence relationship between a service used by a terminal, an edge (local network 20) with which the terminal exchanges data, and a cell (base station 32) that corresponds to a current location of the terminal, for example. If it is detected that a terminal (IoT device) has moved to the area of a cell (base station 32) that corresponds to a different local network 20 along with travelling of an automobile, the monitoring target information management server 15 broadcasts, to abnormal traffic analysis apparatuses 28 (28-1, . . . , 28-*n*) that are respectively included in a plurality of local networks 20 (20-1, . . . , 20-*n*), a message that notifies the abnormal traffic analysis apparatuses 28 of the movement of the target IoT device.

Also, the monitoring target information management server 15 receives messages from the authentication server and a management server (not shown) of the mobile network 33, which is provided in the mobile network 33, with respect to the monitoring target IoT device, and comprehensively manages conditions of communications that the monitoring target IoT device performs using the Wi-Fi communication method and an LTE communication method, in association with a unique identifier (IoT identifier) for identifying the IoT device.

The dynamic map server 14 creates a dynamic map based on data (probe data) received from a plurality of IoT devices, and distributes dynamic map data to terminals (IoT devices). The dynamic map server 14 creates a dynamic map of a higher level than dynamic maps that are managed by dynamic map servers 24 (24-1, . . . , 24-*n*) of the local networks 20 (20-1, . . . , 20-*n*), for example.

The local networks 20 (20-1, . . . , 20-*n*) are networks for realizing the communication system (autonomous mobility system) using an edge computing method. Namely, the local networks constitute network slices that provide services of the autonomous mobility system, at positions that are closer to IoT devices (terminals) than the core networks 10 are. Thus, low-delay communication between IoT devices and servers is realized. In the communication system using the edge computing method, edge servers (22-1, . . . , 22-*n*) that provide services are distributed to the plurality of local networks 20-1, . . . , 20-*n*.

FIG. 2 shows a relationship between a single local network 20 and an IoT device 40 that is installed in an automobile, for example.

To provide services of the autonomous mobility system, the dynamic map server 24, a probe collecting server 26, a gateway 27, and the abnormal traffic analysis apparatus 28 are provided in each local network 20. Note that the local networks 20-1, . . . , 20-*n* have the same configuration, and a detailed description of individual local networks is omitted.

The dynamic map server 24 creates a dynamic map based on data (probe data PD) collected from a plurality of IoT devices 40 by the probe collecting server 26, and distributes dynamic map data DMD via the gateway 27 to the IoT devices 40. The dynamic map server 24 manages a dynamic map of an area that is more localized than dynamic maps managed by the dynamic map servers 14 provided in the core networks 10.

The probe collecting server 26 receives data (probe data PD) transmitted from a plurality of IoT devices 40 via the gateway 27 and records the probe data. The probe collecting server 26 provides probe data collected from the IoT devices 40 to the dynamic map server 24. Probe data includes various kinds of data such as the location of a travelling automobile, the vehicle speed, braking, fuel consumption, etc.

The gateway 27 connects the local network 20 (network slice) to other networks. The gateway 27 receives data from an IoT device 40 that is connected to a Wi-Fi access point 30, via the Internet 16, for example. Also, the gateway 27 receives data from an IoT device 40 that is connected to abase station 32, via a mobile network 33. The gateway 27 cooperates with the abnormal traffic analysis apparatus 28 and has a function of blocking abnormal traffic that is determined as being abnormal through analysis performed by the abnormal traffic analysis apparatus 28, e.g., traffic transmitted from a malicious IoT device 42.

The abnormal traffic analysis apparatus 28 operates as an abnormal traffic detection engine for detecting abnormal traffic, in cooperation with the gateway 27. The abnormal traffic analysis apparatus 28 inputs and analyzes traffic (mirroring traffic) transmitted and received via the gateway 27, and detects and determines abnormal traffic transmitted from a malicious IoT device 42, for example.

Figure 3:
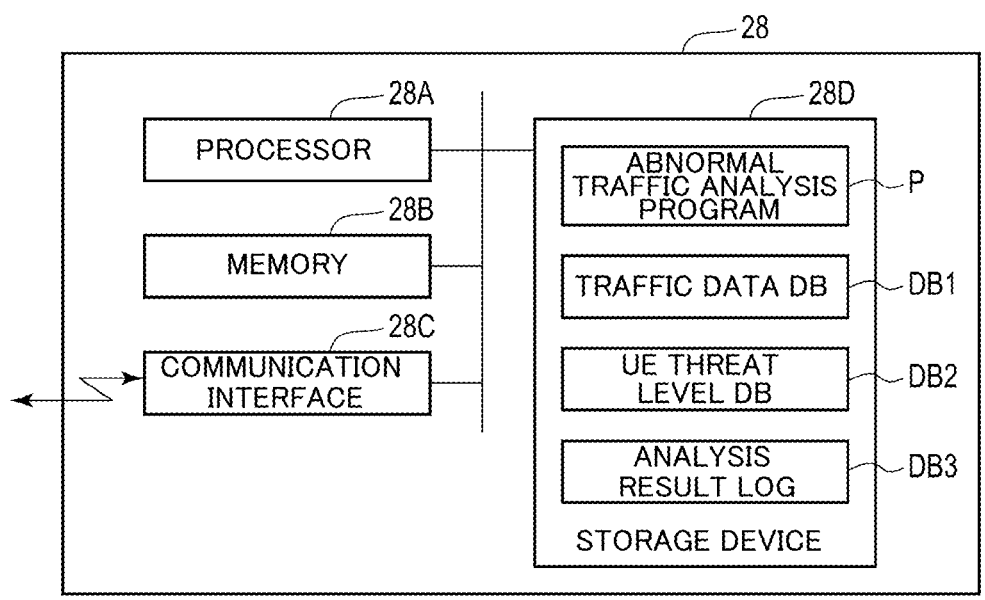
FIG. 3 is a block diagram showing a configuration of an abnormal traffic analysis apparatus according to the present embodiment.

FIG. 3 is a block diagram showing a configuration of the abnormal traffic analysis apparatus 28 according to the present embodiment.

The abnormal traffic analysis apparatus 28 includes a computer that executes programs, a processor 28A, a memory 28B, a communication interface 28C, and a storage device 28D.

The processor 28A is a CPU (Central Processing Unit), for example, and controls each unit of the abnormal traffic analysis apparatus 28 by executing a program stored in the memory 28B. By executing an abnormal traffic analysis program P, the processor 28A realizes an abnormal traffic detection engine (shown in FIG. 4) for detecting abnormal traffic transmitted and received via the gateway 27. The abnormal traffic detection engine includes a functional module and a database.

The memory 28B is used as a work area for processing performed by the processor 28A, and programs and data are stored in the memory 28B.

The communication interface 28C controls communication under the processor 28A.

The storage device 28D is an HDD (Hard Disk Drive) or an SSD (Solid State Drive), for example, and programs to be executed by the processor 28A and various kinds of data are stored in the storage device 28D. The programs stored in the storage device 28D include the abnormal traffic analysis program P. Along with execution of the abnormal traffic analysis program P, a traffic data database DB1, a UE threat level database DB2, an analysis result log DB3, etc., are stored in the storage device 28D.

Figure 4:
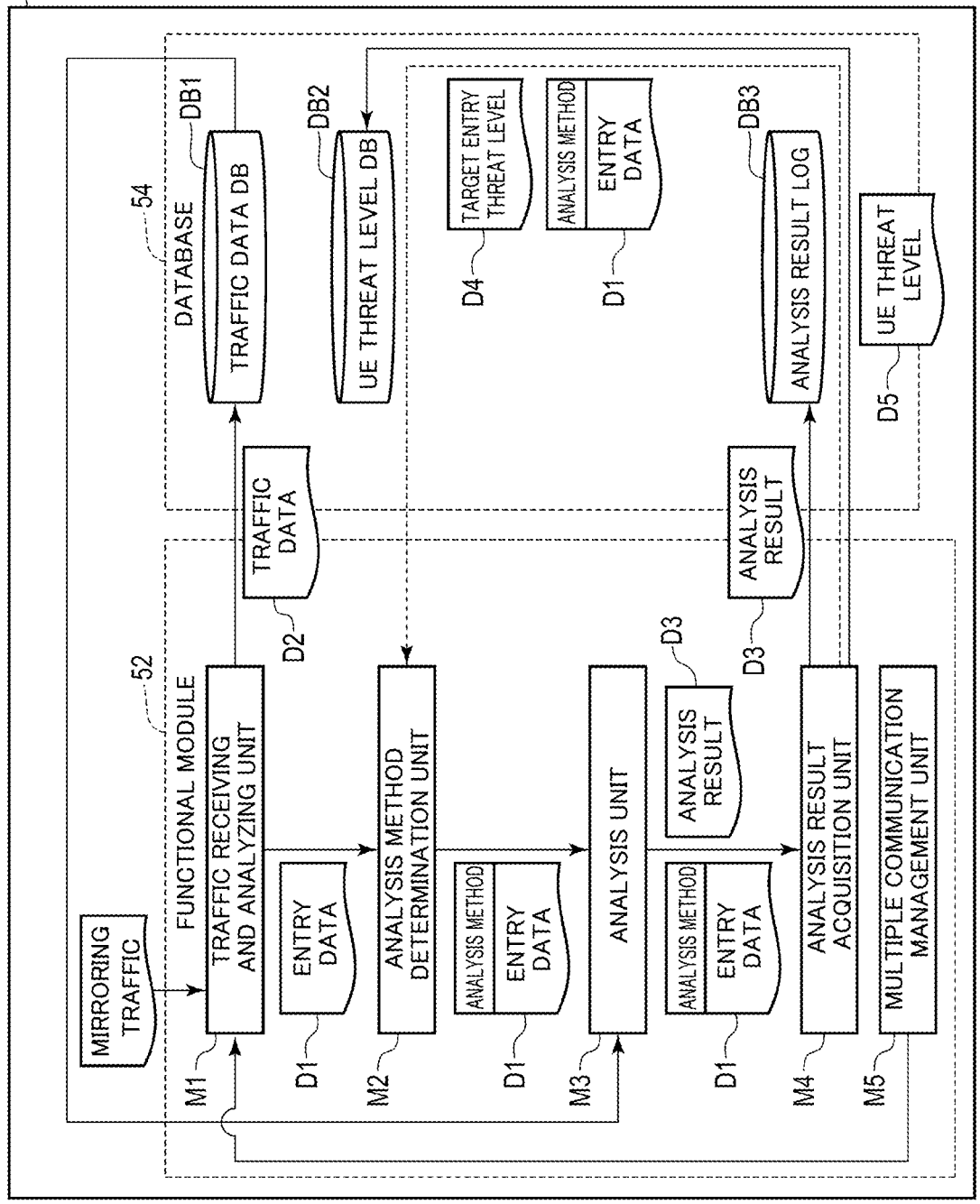
FIG. 4 is a block diagram showing a functional configuration of an abnormal traffic detection engine according to the present embodiment.

FIG. 4 is a block diagram showing a functional configuration of an abnormal traffic detection engine 50 according to the present embodiment. The abnormal traffic detection engine 50 is realized as a result of the abnormal traffic analysis program P being executed by the processor 28A.

A functional module 52 of the abnormal traffic detection engine 50 includes a traffic receiving and analyzing unit M1, an analysis method determination unit M2, an analysis unit M3, an analysis result acquisition unit M4, and a multiple communication management unit M5. Also, as a database 54 for storing data that is processed by the functional module 52, the traffic data database DB1, the UE threat level database DB2, and the analysis result log DB3, are provided.

The traffic receiving and analyzing unit M1 receives traffic (mirroring traffic) that is the same as traffic transmitted to and received by the gateway 27. Traffic received by the traffic receiving and analyzing unit M1 includes traffic that is received from a single IoT device 40 via a plurality of communication paths in which different communication methods (LTE communication and Wi-Fi communication) are used. The traffic receiving and analyzing unit M1 records traffic data, analyzes traffic (a header portion and a payload portion), inquires of the multiple communication management unit M5 the communication path of a packet, and creates entry data that includes data indicating the communication path, for example.

According to a communication path that is identified by the multiple communication management unit M5, the analysis method determination unit M2 determines an analysis algorithm for detecting abnormality of traffic and parameters to be used in analysis that is performed in accordance with the analysis algorithm.

The analysis unit M3 analyzes traffic data. The analysis unit M3 has a plurality of analysis algorithms that respectively correspond to a plurality of communication paths (communication methods) used to transmit traffic, and analyzes traffic according to the analysis algorithm and parameters that are determined by the analysis method determination unit M2.

The analysis result acquisition unit M4 acquires and records a result of analysis performed by the analysis unit M3.

The multiple communication management unit M5 manages a communication path of traffic received by the traffic receiving and analyzing unit M1, and identifies the communication path in response to an inquiry from the traffic receiving and analyzing unit M1.

Next, operations performed in the communication system according to the present embodiment to detect abnormal traffic will be described.

First, the following describes processing performed by the monitoring target information management server 15 to comprehensively manage conditions of communications performed by an IoT device 40 using the Wi-Fi communication method and the LTE communication method.

Figure 5:
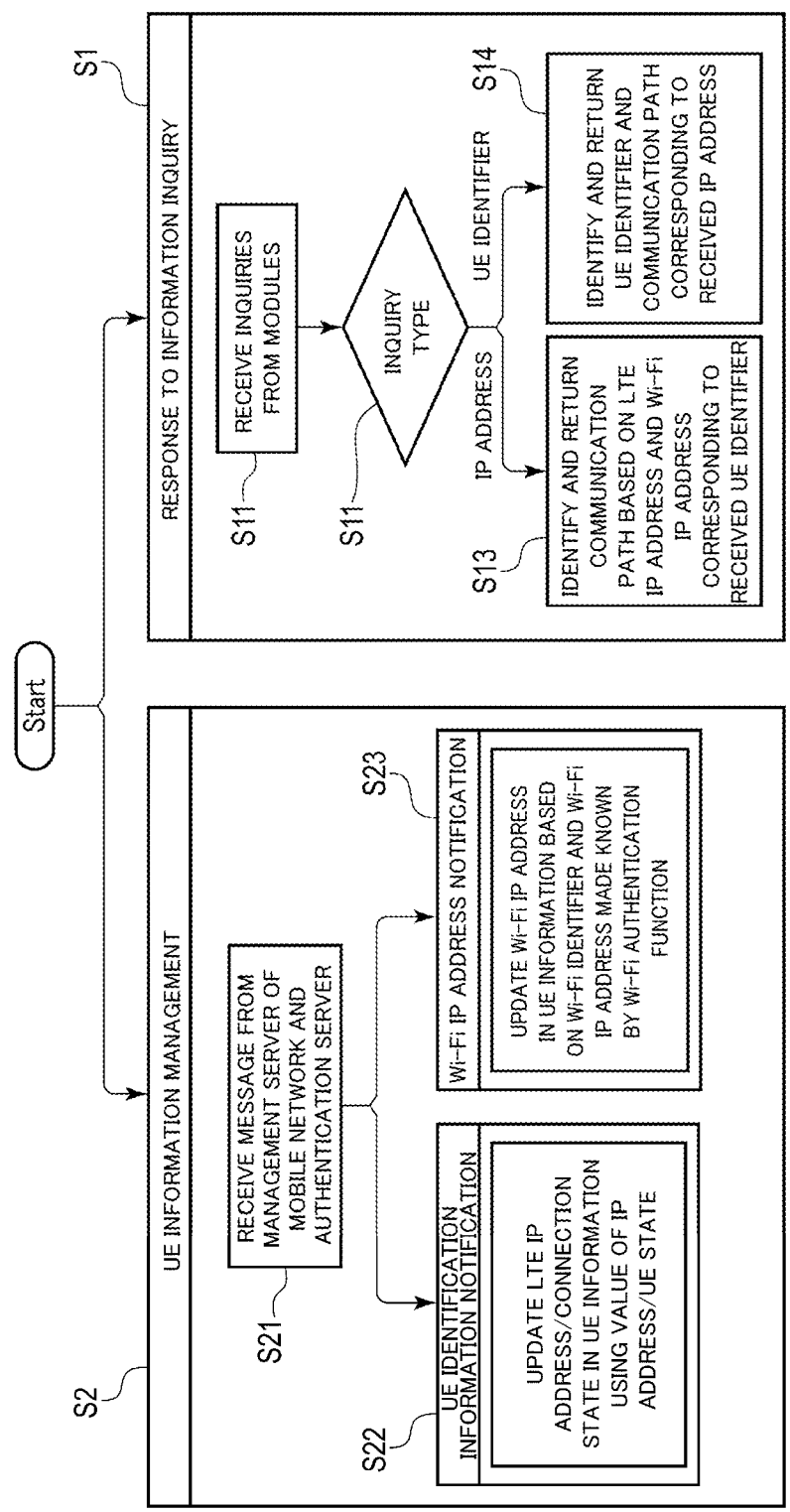
FIG. 5 is a flowchart showing operations of a monitoring target information management server in the present embodiment.

FIG. 5 is a flowchart showing operations of the monitoring target information management server 15 in the present embodiment. Here, UE information management processing (Step S2) shown in FIG. 5 will be described. FIG. 6 is a diagram showing one example of a management table that is managed by the monitoring target information management server 15.

The IoT device 40 continuously transmits probe data while switching communication paths (communication methods) according to operation conditions of the IoT device or the position of the automobile, for example.

If the IoT device 40 uses LTE communication, the monitoring target information management server 15 receives a message from the management server of the mobile network 33 to monitor operation conditions of the IoT device 40. The message from the management server notifies the monitoring target information management server 15 of UE identification information (Step S21).

In response to the notification of the UE identification information, the monitoring target information management server 15 holds, in the management table, an IoT identifier (UE information) that is unique to the IoT device 40 in association with an identifier that corresponds to a communication channel and attribute information. The identifier relating to the communication channel is a terminal identifier (UE identifier) that is associated with IMSI (International Mobile Subscriber Identity), for example. Furthermore, data that serves as attribute information indicating LTE IP address/connection state is updated using values of IP address/UE state included in the message (step S22). As for Wi-Fi, authentication is performed by the authentication server, a correspondence between a Wi-Fi identifier and an IP address is specified, and the monitoring target information management server 15 is notified of the correspondence using a message. Communication paths that can be used (in this example, LTE communication and Wi-Fi communication) are specified in advance in an IoT device that is indicated by the IMSI and the Wi-Fi identifier corresponding to the IoT identifier. Therefore, in the management table, data that indicates conditions of use of LTE communication and data that indicates conditions of use of Wi-Fi communication are managed in association with the IoT identifier. As a result of the IMSI and the Wi-Fi identifier being successively updated, when the IoT device 40 has switched to any of the plurality of communication paths, it is possible to identify the communication path and the communication method used to transmit traffic, because the above-described management table shown in FIG. 6 is held. As a result of information regarding the management table shown in FIG. 6 being successively transmitted to the multiple communication management unit M5 of the abnormal traffic analysis apparatus 28 (security engine in the present embodiment) every time the information is updated, it is possible to perform retrieval to find which communication method is used for traffic of which IP address, when the traffic is analyzed.

If the IoT device 40 uses Wi-Fi communication, the monitoring target information management server 15 receives a message from the authentication server of the cloud to monitor operation conditions of the IoT device 40. The message from the authentication server (Wi-Fi authentication function) notifies the monitoring target information management server 15 of a Wi-Fi identifier and a Wi-Fi IP address (Step S21).

The monitoring target information management server 15 updates the Wi-Fi identifier and the Wi-Fi IP address corresponding to the IoT identifier (UE information) based on the Wi-Fi identifier and the Wi-Fi IP address made known using the message (Step S23).

Thus, conditions of communication paths that are used by an IoT device identified using the IoT identifier are managed in the management table. Accordingly, a communication path (communication method) used to transmit traffic can be identified by referring to the management table based on an identifier unique to the IoT device, which is included in the traffic received by the abnormal traffic analysis apparatus 28.

Figure 7:
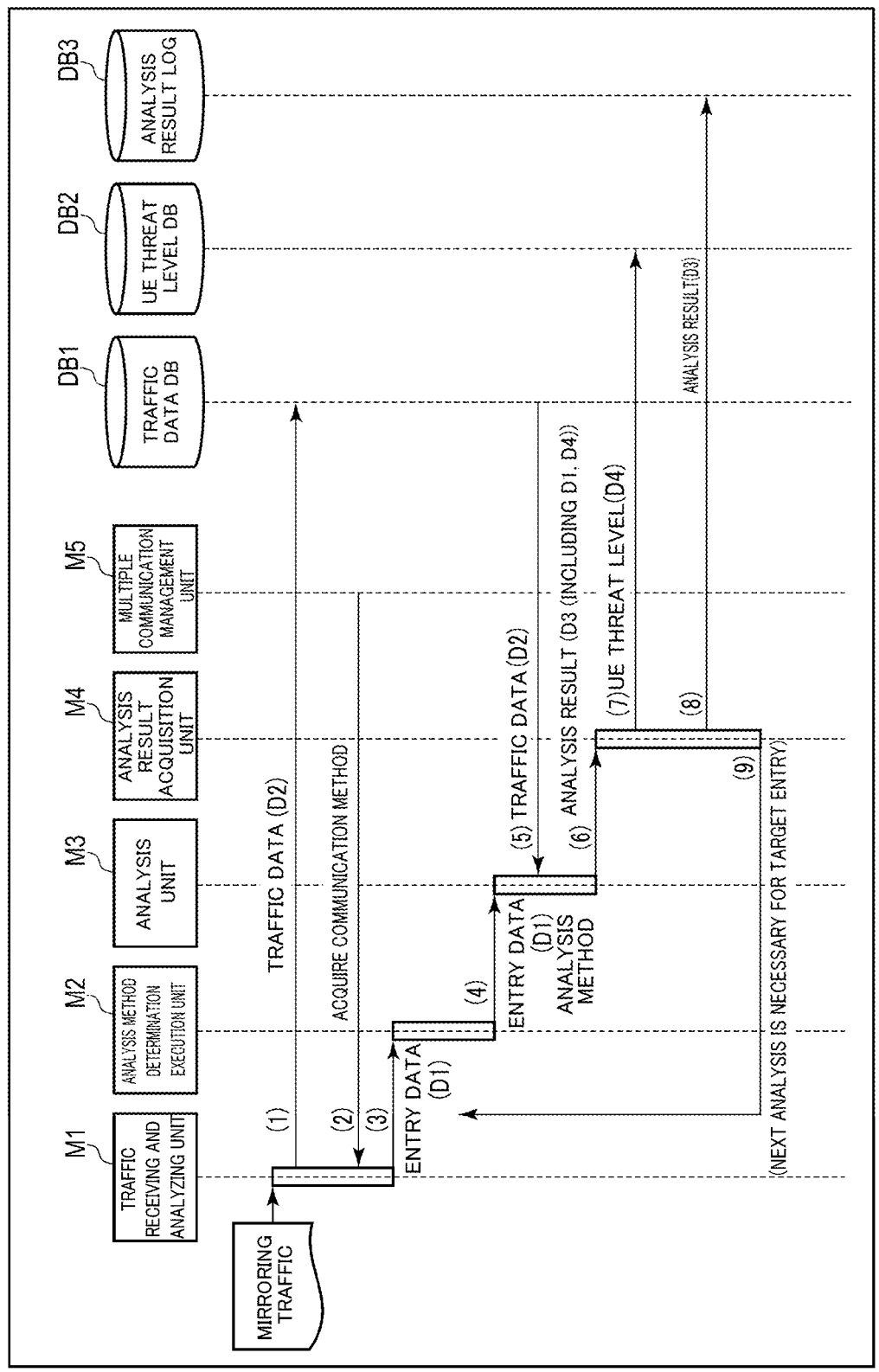
FIG. 7 is a diagram showing a flow of processing performed by the abnormal traffic analysis apparatus.

Next, operations of the abnormal traffic analysis apparatus 28 in the present embodiment will be described with reference to FIGS. 4 and 7. FIG. 7 is a diagram showing a flow of processing performed by the abnormal traffic analysis apparatus (abnormal traffic detection engine 50).

(1) First, upon receiving traffic, the traffic receiving and analyzing unit M1 creates traffic data D2 and writes the traffic data D2 into the traffic database DB1.

(2) The traffic receiving and analyzing unit M1 performs syntactic analysis on the traffic, extracts an identifier that is unique to the IoT device, which is the source, and added to a header portion, selects a packet to be analyzed, and acquires common information, such as 5tupple information (source address, destination addresses, source port number, destination port number, and protocol information), included in an IP (Internet Protocol) packet header, payload information, etc. The identifier unique to the IoT device is an IP address or a terminal identifier (UE identifier) of the IoT device, for example.

The traffic receiving and analyzing unit M1 inquires of the multiple communication management unit M5 the communication path of the traffic based on the identifier unique to the IoT device. In response to the inquiry from the traffic receiving and analyzing unit M1, the multiple communication management unit M5 inquires of the monitoring target information management server 15 the communication path.

The monitoring target information management server 15 receives the inquiry from the multiple communication management unit M5, which is based on the identifier unique to the IoT device, (Step S1) and determines the type of inquiry according to the identifier unique to the IoT device (Step S12).

If the identifier received from the multiple communication management unit M5 is a terminal identifier (UE identifier), the monitoring target information management server 15 identifies the communication path based on an LTE IP address and a Wi-Fi IP address that correspond to the UE identifier by referring to the management table (Step S13).

On the other hand, if the identifier received from the multiple communication management unit M5 is an IP address, the monitoring target information management server 15 identifies a UE identifier and a communication path that correspond to the received IP address by referring to the management table (Step S14).

The monitoring target information management server 15 returns data that indicates the identified communication path to the multiple communication management unit M5.

The multiple communication management unit M5 of the abnormal traffic analysis apparatus 28 notifies the traffic receiving and analyzing unit M1 of the communication path (communication method) made known by the monitoring target information management server 15. The traffic receiving and analyzing unit M1 adds data that indicates the communication method (communication path) acquired from the multiple communication management unit M5 to entry data D1.

Note that, in the above description, the multiple communication management unit M5 makes an inquiry to the monitoring target information management server 15 in response to a request from the traffic receiving and analyzing unit M1, but a configuration is also possible in which the multiple communication management unit M5 acquires the management table from the monitoring target information management server 15 and identifies the communication path (communication method) by referring to the management table. Data of the management table can be acquired from the monitoring target information management server 15 when conditions have changed with respect to an IoT device that is located in a specific area.

(3) The traffic receiving and analyzing unit M1 creates entry data D1 that includes information acquired through syntactic analysis and data indicating the communication path identified by the multiple communication management unit M5 and gives the entry data D1 to the analysis method determination unit M2.

(4) Based on the received entry data D1, the analysis method determination unit M2 determines an analysis algorithm and parameters to be used for analysis in the analysis unit M3, and gives the entry data D1 with data indicating the analysis method added thereto to the analysis unit M3. Namely, the most suitable analysis algorithm and parameters according to the communication path (communication method) used to transmit traffic are determined and specified to the analysis unit M3.

(5) The analysis unit M3 acquires traffic data D2 that corresponds to the received entry data D1 from the traffic database DB.

(6) The analysis unit M3 analyzes the entry data D1 using the analysis method (analysis algorithm and parameters) determined by the analysis method determination unit M2 and gives an analysis result D3 and the entry data D1 to the analysis result acquisition unit M4. The analysis unit M3 executes analysis for determining a threat level of each target entry while repeatedly resetting the degree of detail (degree) of attack detection, for example. A specific example of the analysis will be described later.

(7) The analysis result acquisition unit M4 acquires a target entry threat level D4 (described later) from the received analysis result D3, determines a UE threat level by applying a rule for determining the threat level of the monitoring target IoT device, and updates the UE threat level database DB2.

(8) Furthermore, the analysis result acquisition unit M4 stores the received analysis result D3 in the analysis result log DB3.

(9) The analysis result acquisition unit M4 acquires the target entry threat level D4 from the analysis result D3 and gives the analysis method determination unit M2 entry data D1 for which next analysis needs to be performed and the target entry threat level D4.

Note that (3) the analysis method determination unit M1 determines an analysis method using the analysis degree determination rule and gives the analysis unit M3 the degree of immediately preceding analysis, the target entry threat level, and the entry data D1 with the analysis method added thereto.

Here, a specific example of analysis performed by the analysis unit M3 will be described.

In the UE threat level database DB2, results of attack detection performed with respect to past communications are stored in association with information (e.g., an IP address or a terminal ID) for identifying the source, for each degree of detail (hereinafter also referred to as "degree") of attack detection, such as a detection result of a first degree of detection (analysis A), a detection result of a second degree of detection (analysis B), and so on. In addition, a threat level that is determined from results of attack detection of respective degrees of detail is stored in the UE threat level database DB2, in association with the above information.

The threat level may be expressed using two values, i.e., expressed as 0 or 1, or three or more numerical values may also be set for respective threat levels. For example, a configuration is also possible in which ten numerals 0, 1, . . . , 9 are set for respective threat levels, a larger numeral indicates stronger maliciousness, and traffic is determined as being apparently malicious if the numeral shown in a threat level column is 9.

Assume that, in the UE threat level database DB2, at least sources (e.g., IP addresses or terminal IDs) of information received in the past and threat levels of the information received in the past are stored in association with each other as entry data in advance.

The analysis unit M3 compares an identified source with each entry stored in the UE threat level database DB2 and determines the degree of detail of attack detection to be performed on the received information. More specifically, the analysis unit M3 checks, with respect to traffic for which the source is identified, whether or not an entry that corresponds to the identified source is included in the UE threat level database DB2. The analysis unit M3 may also determine the degree of detail of attack detection to be performed on the received information by using the following analysis degree determination rule (1) or (2), for example.

(1) Specific Example

If the UE threat level database DB2 does not include a corresponding entry, the degree of detail (degree) is set to the first degree. On the other hand, if the UE threat level database DB2 includes a corresponding entry, the degree of detail (degree) is set to a higher degree that is next to the threat level shown in the entry.

(2) Specific Example

If the UE threat level database DB2 does not include a corresponding entry, the degree of detail (degree) is set to the first degree. On the other hand, if the UE threat level database DB2 includes a corresponding entry, the degree of detail (degree) is set to a degree that is equal to the threat level shown in the entry.

In the abnormal traffic analysis apparatus 28 according to the present embodiment, an attack detection algorithm and the degree of detail (degree) are determined according to the communication path (communication method) used to transmit traffic. Examples of attack detection algorithms that can be used in this example include rule base attack detection, detection of port scanning, detection of a change of the used port, detection of a change in the traffic flow rate, detection of a change of the packet receiving timing, DPI, attack detection for detecting abnormality based on a difference between actually measured data and data that is predicted using data acquired as time series data. As the attack detection algorithm becomes more detailed and poses a higher cost, a higher degree of detail (degree) is set.

Next, the analysis unit M3 executes attack detection with respect to the received traffic based on the determined degree of detail (degree) (analysis parameter).

If the result of attack detection is normal, the analysis unit M3 gives the analysis result D3 to the analysis result acquisition unit M4. The analysis result acquisition unit M4 stores information for identifying the source and the detection result (target entry threat level D4) in the analysis result log DB3 and the UE threat level database DB2. An anomaly identifier, a timestamp, information (an IP address or a terminal ID) for identifying the source, detection results for respective degrees of detail, the numbers of times of detection for respective degrees of detail, a final detection result, a countermeasure completion flag, etc., are stored in the analysis result log DB3.

On the other hand, if the result of attack detection is not normal (there is concern or abnormality), the analysis unit M3 determines whether or not it is necessary to perform attack detection of a higher degree with respect to the received traffic. If it is determined that attack detection of a higher degree is unnecessary, the analysis result acquisition unit M4 stores, as the result of analysis performed by the analysis unit M3, information for identifying the source and the detection result in the analysis result log DB3 and the UE threat level database DB2.

Cases in which the result of attack detection is not normal include the following specific cases (1) and (2), for example. (1) The communication is apparently abnormal (unauthorized) and therefore there is not much need to execute attack detection of a higher degree. If the numeral shown in the above-described threat level column is 9, for example, the communication is apparently malicious and therefore attack detection of a higher degree can be omitted to effectively use calculation resources. (2) Attack detection of the highest degree has been already executed, and attack detection of a higher degree cannot be executed.

On the other hand, if it is determined that attack detection of a higher degree needs to be performed, the analysis unit M3 redetermines the degree of detail of attack detection to be performed on the received information, based on the result of attack detection. The analysis unit M3 executes attack detection again based on the redetermined degree of detail (degree). If the result of attack detection is determined as not being normal, the analysis unit M3 determines whether or not it is necessary to further perform attack detection of a higher degree. This process is repeatedly executed so long as the result of attack detection is determined as not being normal. The following specific methods (1) to (4) can be used as methods for redetermining the degree of detail (degree) by the analysis unit M3.

(1) Specific Example

The degree of detail (degree) of target attack detection is always increased by one.

(2) Specific Example

Cases in which output of the attack detection algorithm is expressed using three levels, i.e., normal/there is concern/ there is abnormality.

Output=there is concern→determination result=Yes (the degree is increased by one)

Output=there is abnormality→determination result=Yes (the degree is increased by two)

(3) Specific Example

Cases in which output of the attack detection algorithm is expressed using three levels, i.e., normal/there is concern/there is abnormality.

Output=there is concern→determination result=No (the degree is not increased→S15aN→End)

Output=there is abnormality→determination result=Yes (the degree is increased by one)

(4) Specific Example

Cases in which output of the attack detection algorithm represents the presence or absence of abnormality using a numerical value. For example, a case in which output of the attack detection algorithm is 0.0 to 1.0, the degree of abnormality increases as the value approaches 1.0, and a threshold value used for determining the presence or absence of abnormality is 0.5.

Output=0.5 or more and less than 0.6→determination result=Yes (the degree is increased by one)

Output=0.6 or more and less than 0.7→determination result=Yes (the degree is increased by two)

Output=0.7 or more and less than 0.8→determination result=Yes (the degree is increased by three)

Output=0.8 or more and less than 0.9→determination result=Yes (the degree is increased by four)

Output=0.9 or more→determination result=Yes (the degree is increased by five)

According to the abnormal traffic analysis apparatus 28 of this example, attack detection is ended early as for an IoT device (device) that has a low risk, and therefore calculation resources can be kept from being unnecessarily used.

Similarly, attack detection is ended early as for an IoT device that is apparently unauthorized as well, and therefore calculation resources can be kept from being unnecessarily used.

Furthermore, if the risk of an IoT device is in a gray area, processing is repeatedly executed to ensure reliability of attack detection.

Furthermore, as for an IoT device that is registered as an entry in the UE threat level database DB2, a degree of detail according to the registered threat level is initially set, and accordingly attack detection of a lower degree of detail is appropriately skipped, and calculation resources can be kept from being unnecessarily used.

As described above, according to the abnormal traffic analysis apparatus 28 of this example, calculation resources can be effectively used.

Note that the above-described analysis of traffic is one example, and the present invention can also be applied to another analysis. In such a case, similarly to the above-described analysis, the communication path of traffic is identified, and an analysis algorithm and analysis parameters are selected according to the communication path. For example, if analysis for detecting DOS (Denial of Service) attack is performed, a threshold value is changed according to the communication method.

As described above, in the abnormal traffic analysis apparatus 28 according to the present embodiment, the communication path (communication method) used to transmit traffic is identified and the traffic is analyzed using an analysis algorithm and analysis parameters according to the communication path (communication method). Therefore, even if the communication path is changed by an application of the IoT device 40, analysis can be appropriately performed regardless of the communication path, and the rate of detection of abnormal traffic can be improved.

Each method described in the embodiment can be stored, as a program (software means) that can be executed by a computer, in a recording medium, such as a magnetic disk (flexible disk, hard disk, etc.), an optical disk (CD-ROM, DVD, MO, etc.), or a semiconductor memory (ROM, RAM, flash memory, etc.), for example, or transmitted and distributed using a communication medium. Note that a program that is stored on the medium side includes a setting program for configuring, in the computer, software means (including not only an execution program but also a table or a data structure) to be executed by the computer. A computer that realizes the present apparatus executes the above-described processing by reading a program recorded in a recording medium, and in some cases, constructing software means following a setting program, and as a result of operations being controlled by the software means. Note that a recording medium mentioned in the present specification is not limited to a recording medium that is to be distributed, but also includes a storage medium, such as a magnetic disk, a semiconductor memory, etc., that is provided in a computer or a device connected to the computer via a network.

Note that the present invention is not limited to the above-described embodiment, and various alterations can be made within a scope not departing from the gist of the present invention when the present invention is implemented. Furthermore, in implementation of embodiments, the embodiments can be appropriately combined as far as possible, and in such a case, combined effects can be achieved. Furthermore, the above-described embodiment includes inventions in various stages, and various inventions can be extracted by appropriately combining a plurality of disclosed constitutional elements.

REFERENCE SIGNS LIST 10 (10-1, . . . , 10-m) Core network
12 Cloud server
14 Dynamic map server
16 Internet
20 (20-1, . . . , 20-n) Local network
22 (22-1, . . . , 22-n) Edge server
24 (24-1, . . . , 24-n) Dynamic map server
26 (26-1, . . . , 26-n) Probe collecting server
27 (27-1, . . . , 27-n) Gateway
28 (28-1, . . . , 28-n) Abnormal traffic analysis apparatus
28A Processor
28B Memory
28C Communication interface
28D Storage device
30 Wi-Fi Access points
32 Base station
M1 Traffic receiving and analyzing unit
M2 Analysis method determination unit
M3 Analysis unit
M4 Analysis result acquisition unit
M5 Multiple communication management unit
DB1 Traffic data database
DB2 UE threat level database
DB3 Analysis result log

The invention claimed is:

1. An abnormal traffic analysis apparatus comprising:
a processor; and
a non-transitory computer-medium having computer program instructions stored thereon, wherein the instructions are executable by the processor and perform to:

receive traffic from a device via a communication path of a plurality of communication paths in which different communication methods are used;

identify a communication path through which the traffic is transmitted;

determine an analysis algorithm of a plurality of analysis algorithms and one or more analysis parameters for detecting abnormality of the traffic according to the communication path identified, wherein:

the one or more analysis parameters includes a degree of detail of attack detection, the degree of detail of attack detection is indicative of a level of threat associated with the traffic, and each of the plurality of analysis algorithms is configured to perform an analysis for attack detection with respect to a specific communication path based on a determined degree of detail of attack detection; and analyze whether or not the traffic is abnormal traffic by using the analysis algorithm and the determined one or more analysis parameters; and record a result of analysis performed.

2. The abnormal traffic analysis apparatus according to claim 1, wherein the instructions further perform to: acquire data that indicates the communication path through which the traffic is transmitted, by making an inquiry to an external server that manages conditions of communication performed by the device, based on an identifier that is included in the traffic.

3. The abnormal traffic analysis apparatus according to claim 1, wherein, according to the communication path identified, the instructions further perform to change the analysis parameter to be used in the analysis algorithm according to the communication path.

4. A method for analyzing abnormal traffic comprising: a receiving step of receiving traffic from a device via any of a plurality of communication paths in which different communication methods are used; a multiple communication management step of identifying a communication path through which the traffic is transmitted; an analysis method determination step of determining an analysis algorithm of a plurality of analysis algorithms and one or more analysis parameters for detecting abnormality of the traffic according to the communication path identified in the multiple communication management step, wherein:

the one or more analysis parameters includes a degree of detail of attack detection, the degree of detail of attack detection is indicative of a level of threat associated with the traffic, and each of the plurality of analysis algorithms is configured to perform an analysis for attack detection with respect to a specific communication path based on a determined degree of detail of attack detection; and an analysis step of analyzing whether or not the traffic is abnormal traffic by using the analysis algorithm and the determined one or more parameters in the analysis method determination step; and an analysis result recording step of recording a result of analysis performed in the analysis step.

5. The method according to claim 4 further comprises acquiring data that indicates the communication path through which the traffic is transmitted, by making an inquiry to an external server that manages conditions of communication performed by the device, based on an identifier that is included in the traffic.

6. The method according to claim 4 further comprising determining a threat level of the device based on the result of the analysis, storing the threat level in a database, and setting the degree of detail of attack detection.

7. The method according to claim 6, wherein the degree of detail is set to a degree that is equal to the threat level when no threat level is stored in the database.

8. The method according to claim 6, wherein the degree of detail is set to a degree that is higher than the threat level when the threat level is stored in the database.

9. The method according to claim 6, wherein the degree of detail is set to a degree equal the threat level when the threat level is stored in the database.

* * * * *